(12) United States Patent
Kurth et al.

(10) Patent No.: US 10,883,586 B2
(45) Date of Patent: Jan. 5, 2021

(54) PLANETARY DIFFERENTIAL DEVICE AND METHOD FOR PRODUCING A PLANETARY DIFFERENTIAL DEVICE

(71) Applicant: SCHAEFFLER TECHNOLOGIES AG & CO. KG, Herzogenaurach (DE)

(72) Inventors: Franz Kurth, Nuremberg (DE); Ralph Schimpf, Fuerth (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 8 days.

(21) Appl. No.: 16/321,763

(22) PCT Filed: Jun. 29, 2017

(86) PCT No.: PCT/DE2017/100545
§ 371 (c)(1),
(2) Date: Jan. 29, 2019

(87) PCT Pub. No.: WO2018/019323
PCT Pub. Date: Feb. 1, 2018

(65) Prior Publication Data
US 2019/0170233 A1    Jun. 6, 2019

(30) Foreign Application Priority Data
Jul. 29, 2016   (DE) .......................... 10 2016 214 015

(51) Int. Cl.
*F16H 48/40*   (2012.01)
*F16H 48/10*   (2012.01)
*F16H 48/11*   (2012.01)

(52) U.S. Cl.
CPC ............. *F16H 48/11* (2013.01); *F16H 48/10* (2013.01); *F16H 48/40* (2013.01); *F16H 2048/106* (2013.01)

(58) Field of Classification Search
CPC .......... F16H 48/10; F16H 48/11; F16H 48/40; F16H 2048/106; F16H 57/08; F16H 57/082
See application file for complete search history.

(56) References Cited

U.S. PATENT DOCUMENTS 5,443,430 A * 8/1995 Parsons ................... F16H 48/10
475/248
5,713,812 A    2/1998 Hiraishi et al.
(Continued)

FOREIGN PATENT DOCUMENTS

DE    1136585 B    9/1962
DE    4027368 A1   3/1992
(Continued)

OTHER PUBLICATIONS

International Search Report for International Application No. PCT/DE2017/100545 dated Oct. 5, 2017.

*Primary Examiner* — Ernesto A Suarez
*Assistant Examiner* — Lillian T Nguyen
(74) *Attorney, Agent, or Firm* — Brooks Kushman P.C.

(57) ABSTRACT

A planetary differential device includes first and second sun gears coaxially arranged in relation to each other and defining a main axis. First and second planetary gears mesh with the first and second sun gears and mesh with each other in pairs. A planet carrier has two side disks, and the planetary gears are rotatably arranged in the planet carrier. A coupling gear is arranged coaxially to the main axis and is rigidly connected to the planet carrier. The side disks are respectively connected to the coupling gear in a material fit and form a receiving housing with a housing inner space, at least one of the side disks includes an assembly opening through which the planetary gears and the sun gears can be inserted into the inner space of the housing.

17 Claims, 2 Drawing Sheets

(56) References Cited

U.S. PATENT DOCUMENTS

| | | | | |
|---|---|---|---|---|
| 2014/0378264 A1* | 12/2014 | Biermann | ............ | F16H 57/082 |
| | | | | 475/248 |
| 2015/0126322 A1* | 5/2015 | Biermann | ............... | F16H 48/11 |
| | | | | 475/252 |
| 2015/0377334 A1* | 12/2015 | Swales | .................... | F16H 48/10 |
| | | | | 475/220 |
| 2018/0320769 A1* | 11/2018 | Kurth | .................... | F16H 57/082 |
| 2019/0211911 A1* | 7/2019 | Martini | .................. | F16H 48/10 |

FOREIGN PATENT DOCUMENTS

| | | | | | |
|---|---|---|---|---|---|
| DE | 102011087579 A1 | * | 6/2013 | ............. | F16H 48/11 |
| DE | 102012215279 A1 | * | 3/2014 | ............. | F16H 48/11 |
| DE | 102014203830 A1 | | 5/2015 | | |
| DE | 102014213329 A1 | | 1/2016 | | |
| DE | 102015214035 A1 | * | 1/2017 | ........... | B60K 17/346 |
| EP | 2484934 B1 | | 4/2013 | | |
| WO | 2013036483 A1 | | 3/2013 | | |

\* cited by examiner

US 10,883,586 B2

PLANETARY DIFFERENTIAL DEVICE AND METHOD FOR PRODUCING A PLANETARY DIFFERENTIAL DEVICE

CROSS-REFERENCE TO RELATED APPLICATIONS

This application is the U.S. National Phase of PCT/DE2017/100545 filed Jun. 29, 2017, which claims priority to DE 102016214015.9 filed Jul. 29, 2016, the entire disclosures of which are incorporated by reference herein.

TECHNICAL FIELD

The disclosure relates to a planetary differential device, in particular for a vehicle. The disclosure also relates to a method for producing the planetary differential device.

BACKGROUND

Differential devices are used to distribute torque flows in the drive train of a vehicle, e.g. to two wheels of a driven axle or to two driven axles of the vehicle. The differential devices normally have an input, into which the torque is introduced, and two outputs, from which the torque is output. A special construction of the differential device is implemented by the use of gears in the differential device. This type of planetary differential has a limited axial width.

DE 10 2014 213 329 A1 relates to a planetary gearing for a motor vehicle that has a drive gear with an outer toothing and two planet carriers with disk-shaped carrier sections that are spaced apart from one another, wherein the planet carriers are connected by the two carrier sections to the drive gear for conjoint rotation therewith, wherein a first planet gear set that meshes with the first sun gear, and a second planet gear set that meshes with the second sun gear are rotatably supported between the two carrier sections on the planet carrier, and wherein a torque applied to the drive gear can be conveyed from the drive gear to the first and/or second sun gear via the planet gear set, wherein the first carrier section of the planet carrier is formed as an integral component of the drive gear, wherein the second carrier section of the planet carrier is attached to the drive gear by means of a material bonded connection.

DE 10 2014 203 830 A1 relates to a planetary gearing for a motor vehicle that has a drive gear, from which a torque can be conveyed via a planet carrier to a first planet gear set and/or a second planet and to a first and/or second sun gear, and has a connecting component that can be connected to the drive gear and/or the planet carrier. There is a material bonded connection between the connecting component and the planet carrier, that is large enough that 90% to 100% of the torque applied to the drive gear is conveyed via the material bonded connection.

WO 2013/036483 A1 describes a compact planetary differential gear set that comprises first and second sun gears, a first set and second set of planet gears, and a carrier with a ring gear. The carrier is a welded component and encompasses the sun gears and the planet gears.

Another planetary differential is shown in EP 248 4934 B1, for example, which forms the closest prior art. This planetary differential has two sun gears, which mesh with two sets of planet gears. The planet gears are located in a planet carrier. In particular, a first set of planet gears meshes with one sun gear and a second set of planet gears meshes with the other sun gear. The planet gears of the two sets mesh in pairs with one another. The sun gears form the output for the planetary differential.

SUMMARY

An object of this disclosure is to propose a planetary differential device that is distinguished by a simple production process.

The subject matter of this disclosure is thus a planetary differential device that is suitable and/or configured for a vehicle. The planetary differential device is configured in particular as a transverse differential device for distributing a drive torque to two driven wheels or axles, or as a longitudinal differential device, which distributes a drive torque to two driven axles of the vehicle.

The planetary differential device may have toothed gears serving as the gears, which have a toothing on the outer circumference, in particular a straight toothing or a diagonal toothing. The rotational axes of the gears may be parallel to one another, resulting in a very slender assembly in the axial direction.

The planetary differential device has a first and second sun gear, wherein the sun gears are coaxial to one another and define a main axis of the planetary differential device. In particular, the first and second sun gears each form an output for the planetary differential device.

Furthermore, the planetary differential device has first and second planet gears, which are spaced radially apart from the main axis. In particular, the rotational axis of the first planet gear is located on a first pitch circle and the rotational axis of the second planet gear is located on a second pitch circle, wherein the pitch circles may be identical, but may have different diameters. The first planet gears mesh with the first sun gear. The second planet gears mesh with the second sun gear. A first sun gear meshes with a second sun gear to obtain a driving coupling of the first and second sun gears. The first and second planet gears thus mesh in pairs with one another.

The planetary differential device has a planet carrier. The planet gears are rotatably disposed in the planet carrier. The planet carrier may support planet gear pins on which the planet gears, e.g. the first and second planet gears, are rotatably disposed. The planet carrier has two lateral disks, and the planet carrier may be formed by the two lateral disks. The lateral disks can be planar, but these may be contoured in the axial direction, such that various functional elements can be integrated in the lateral disks. It is also possible to improve the rigidity of the lateral disks with the contouring.

The planetary differential device has a coupling gear, wherein the coupling gear is coaxial to the main axis. The coupling gear is permanently connected to the planet carrier. The coupling gear may have an outer toothing, or it can be a crown gear or bevel gear.

It is proposed that the lateral disks are each materially bonded to the coupling gear. The lateral disks and the coupling gear thus form a receiving housing with a housing interior. The coupling gear may be a ring, wherein the lateral disks are placed in or on the ring and materially bonded thereto.

At least one, or precisely one of the lateral disks forms an installation disk. The installation disk has an installation hole, particularly formed in the middle and/or coaxial to the main axis. The installation hole, in particular with regard to is diameter, is configured such that the planet gears and the sun gears can be inserted into the housing interior. In particular, the diameter of the installation hole is greater than the largest outer diameter of the sun gears.

One consideration of the disclosure is that the welding procedure is moved forward in the production sequence by the assembly of a receiving housing and the subsequent installation of the inner components, in particular the planet gears and the sun gears, in the receiving housing, and a welding procedure for closing the receiving housing after it has been populated can be avoided. It is also possible to remove the sun gears and/or planet gears from the receiving housing and replace them in the event of repairs.

It is provided in the framework of the configuration of the planetary differential device according to the disclosure that the receiving housing may be formed via a thermal procedure in a first production step. Subsequently—following post-processing steps, if applicable—only the components are installed, such that the components are not exposed to weld spatters, smoke residue, soot or similar contaminants. Among the advantages of the planetary differential device is the fact that no more welding is required after the installation of the inner components. The installation may be the last production step of the planetary differential device.

In a further development of the disclosure, the lateral disks are welded to the coupling gear over the circumference thereof around the main axis. As a result, the bearing capacity of the receiving housing is increased. In particular, the weld is continuous and/or uninterrupted. The lateral disks and the coupling gear may be arranged such that an I-seam at the butt joint can be used for the welding geometry. It is possible in this manner to define the position of the lateral disks in the coupling gear. As a result of the design of the welding seam, the components of the receiving housing are centered in relation to one another. The coupling gear may have a receiver, e.g. a circumferential bearing shoulder, in which the lateral disks are each received centrally, in a form-fitting manner, and subsequently welded in place.

In a further development of the disclosure, at least one of the lateral disks, and in one embodiment both lateral disks, has a bearing slot. The lateral disk may have a lip, wherein the lip contains the bearing seat for a bearing, in particular a sliding bearing or a roller bearing. As a result, another function is integrated in the lateral disk, specifically that of a bearing seat. The bearing seat is brought into a permanent spatial relationship to the coupling gear and thus to a connecting geometry of the receiving housing and/or the planetary differential device.

In another further development of the disclosure, the planetary differential device has an end cap, wherein the end cap is placed on the lateral installation disk. The end cap seals the installation hole, at least in part. Furthermore, the end cap secures the adjacent sun gear, the second sun gear in this example, in an axial direction in relation to the main axis. The second sun gear can rotate axially against the end cap or an element braced against the end cap, and is thus secured in place. The end cap ensures that the components of the planetary differential device are not able to fall out of the planetary differential device, counter to the direction of installation. The end cap also has another function, specifically the axial securing of the adjoining sun gear in the axial direction.

In a further development of the disclosure, the end cap has a sliding bearing bushing for supporting the sun gear, in particular in the radial and/or axial direction. The end cap may be secured in a form-fitting manner in the lateral installation disk. By way of example, the end cap is installed in the lateral installation disk via a press fit, and thus in a force-fitting manner. As a result, no thermal procedure takes place in the assembly of the end cap, e.g. welding, such that no contamination can occur, e.g. through welding spatters, soot, smoke residue, etc. or other emission products.

In an embodiment, the planetary differential device has first and second planet gear pins. The planet gear pins support the planet gears, wherein the planet gears can rotate on the planet gear pins. By way of example, there is a bearing mechanism between each of the planet gears and the planet gear pins, in particular a sliding bearing mechanism or a roller bearing mechanism. The planet gear pins are secured in a form-fitting manner in the receiving housing by means of a sealing procedure. By way of example, the planet gear pins are secured in a form-fitting manner by caulking the planet gear pins and/or the lateral disks.

In a structural implementation of the disclosure, at least one of the lateral disks, and in one embodiment both lateral disks, has at least one through hole for a planet gear pin. The planet gear pins can be inserted into the assembled receiving housing through the through hole. Furthermore, the lateral disk can receive the planet gear pin such that it can be secured in the lateral disk through simple caulking.

Another aspect of the disclosure relates to a method for producing the planetary differential device described above, or according to any of the preceding claims. The method comprises the steps:

Joining the coupling gear and the lateral disks to the receiving housing; subsequent installation of the planet gears and the sun gears in the housing interior of the receiving housing. In a further step, the end cap may be placed on the lateral installation disk.

In a further development of the disclosure, at least one bearing seat for a bearing mechanism and/or at least one through hole for receiving one of the planet gear pins is formed or produced prior to installing the planet gears, and/or a finishing of the toothing of the coupling gear is carried out. The production of the aforementioned functional surfaces, in particular the through hole and the bearing seat, after joining the coupling gear and the lateral disks to the receiving housing, has the advantage that in this manner, the relative position of the coupling gear to the functional surfaces is established conclusively, and the corresponding fine processing and/or finishing can be carried out in relation to the relative positions thereof. In other words, the functional surfaces of the coupling gear and the functional surfaces of the lateral disks are defined and conclusively positioned in relation to one another. By way of example, the functional surfaces of the coupling gear can be used as a reference for processing the functional surfaces of the lateral disks, or vice versa.

It is provided in particular that after producing the receiving housing, no more thermal processes are applied to the planetary differential device, i.e. processes involving temperatures above 300° C., in order to avoid contamination by waste products of the thermal process, e.g. welding spatter, soot, smoke residue, etc., and/or thermal warping.

BRIEF DESCRIPTION OF THE DRAWINGS

Further features, advantages and effects of the disclosure can be derived from the following description of a exemplary embodiment of the disclosure and from the attached figures. Therein.

DETAILED DESCRIPTION OF THE DRAWINGS

Figure 1:
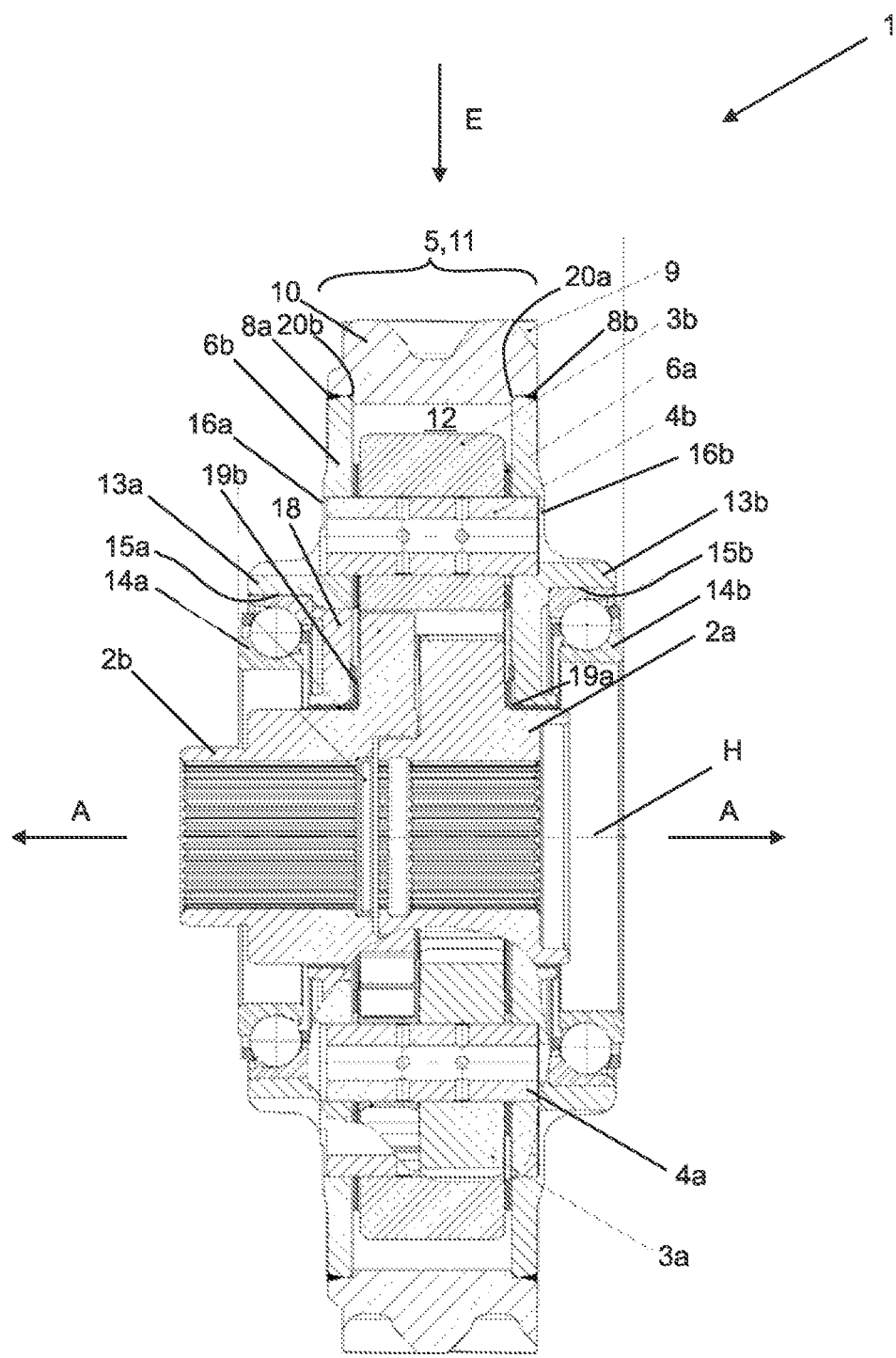
FIG. 1 shows a schematic longitudinal sectional view along a main axis of a planetary differential device as a first exemplary embodiment of the disclosure.

FIG. 1 shows a planetary differential device 1 in a schematic longitudinal sectional view along a main axis H as a first exemplary embodiment of the disclosure. The planetary differential device 1 is designed to distribute an input torque, introduced via an input E, to two outputs A. The planetary differential device 1 can be used as either a longitudinal differential device or a transverse differential device in a vehicle.

The planetary differential device 1 has a first sun gear 2a and a second sun gear 2b, which are oriented coaxial to the main axis H, and which have plug-in toothings that engage in plug-in shafts (not shown). There is an outer toothing on the radial external surface following the circumference thereof, which encircles the main axis H. The sun gears 2a, b in this exemplary embodiment are nested, such that they center one another radially. The outer toothings are axially adjacent to one another.

The planetary differential device 1 also has first planet gears 3a and second planet gears 3b. The first planet gears 3a are only half as wide or broad as the second planet gears 3b in the axial direction with respect to the main axis H. The first planet gears 3a mesh with the first sun gear 2a. The second planet gears 3b mesh with the second sun gear 2b. Furthermore, the first planet gears 3a and the second planet gears 3b each mesh in pairs with one another. For this, the axial width of the second planet gear 3b is great enough that it also extends into the engagement range of the first planet gear 3a. The planet gears 3a, b are placed on first and second planet gear pins 4a, b. The planet gear pins 4a, b are hollow pins, wherein there is a through hole or blind hole in the planet gear pins 4a, b for a lubricant. The planet gears 3a, b are placed on the planet gear pins 4a, b, and supported by a sliding bearing, wherein lubricant is supplied to the sliding bearing points via radial holes. The planet gears 3a, b and the planet pins 4a, b are on two different pitch circles encircling the main axis H.

The planetary differential device 1 has a planet carrier 5 in which the planet gear pins 4a, b are secured. The planet carrier 5 is formed by two lateral disks 6a, b, which are parallel to one another in the axial direction. The second lateral disk 6b forms a lateral installation disk 7, as shall be explained in greater detail below. The lateral disks 6a, b have a circular periphery, and connected in a materially bonded manner to the coupling gear 9 via a first and second welding seam 8a, b. The coupling gear 9 is in the form of a ring gear, which receives the first and second lateral disks 6a, b on its inner circumference. The lateral disks 6a, b are countersunk axially into the coupling gear 9, such that they are flush therewith, or slightly below the rim. They may be flush therewith, because the welding seams 8a, b can then take the form of I-seams in a butt joint, as shown in FIG. 1. By way of example, the welding seams 8a, b are formed by laser welds.

The coupling gear 9 has a toothing 10 on its outer circumference, forming a diagonal toothing in this example, for a mechanical coupling and for transferring drive torque.

A receiving housing 11 is created by the first and second lateral disks 6a, b and the coupling gear 9, which provides a housing interior space. The planet gears 3a, b and at least the toothed sections of the sun gears 3a, b, 2a, b are located in the housing interior 12. The lateral disks 6a, b each have a lip 13a, b, in which bearing mechanisms 14a, b are located, forming ball bearing mechanisms in this case, which support the receiving housing 11 with respect to the surrounding structure. There is a bearing seat 15a, b in each of the lips 13a, b for an outer ring of the bearing mechanism 14a, b.

Furthermore, the lateral disks 6a, b have at least one through hole, optionally two through holes 16a, b, through which the planet gear pins 4a, b can be inserted.

Figure 2:
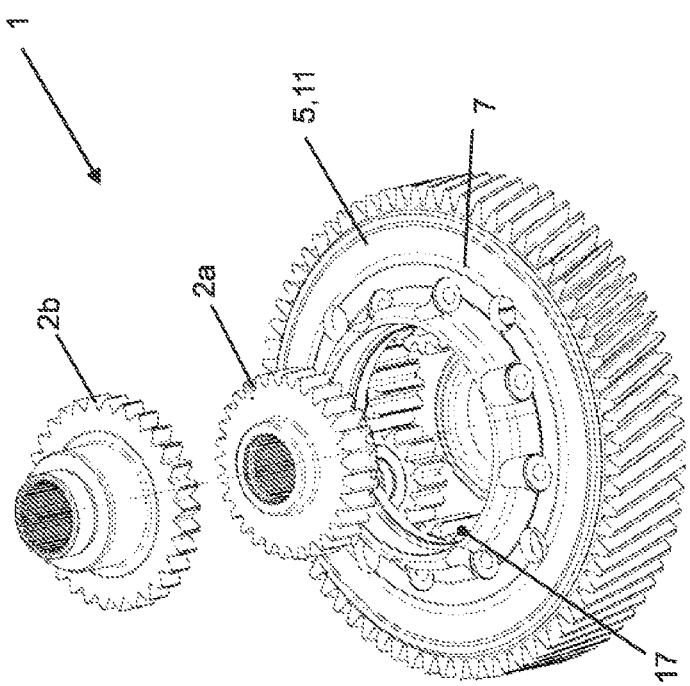
FIG. 2 shows a schematic three-dimensional illustration of the planetary differential device in FIG. 1, with the sun gears inserted therein.

An intermediate layer for finishing the planetary differential device 1 is shown in FIG. 2, wherein the sun gears 2a, b are placed in the receiving housing 11 in a first step. It is intended that the receiving housing 11 is produced in a first step in the assembly, in that the lateral disks 6a, b are welded to the coupling gear 9 via the welding seams 8a, b.

In a subsequent, optional intermediate step, the functional surfaces in the receiving housing 11 are produced or completed. Optionally, the functional surfaces can also be introduced in this state. The toothing 10, bearing seats 15a, b, and the through holes 16a, b comprise the functional surfaces. The toothing 10 defines the position of the planetary differential device 1 in relation to a drive gearing. The bearing seats 15a, b define the positions of the bearing mechanisms 14a, b and thus the position of the planetary differential device 1 in relation to a surrounding structure. The precise positions of the planet gear pins 4a, b and thus the positions of the planet gears 3a, b are determined by the through holes 15a, b. To orient these functional surfaces within the smallest possible tolerance range, the production or completion of at least one or all of the functional surfaces takes place after the lateral disks 6a, b have been connected in a material bonded manner to the coupling gear 9. All of the steps that could lead to a contamination of the receiving housing 11 through welding emissions, e.g. welding spatters, etc., are first completed after this step, and all of the sources for a thermal warping in the receiving housing 11 are likewise completed. In particular, after joining the receiving housing 11, no more thermal processes are carried out on the planetary differential device 1. The receiving housing 11 can be processed with an arbitrary precision, such that the aforementioned functional surfaces can retain their target positions in relation to one another.

In a next step, the planet gears 3a, b and planet gear pins 4a, b are first inserted. The planet gear pins 4a, b are caulked, for example, to the lateral disks 6a, b, thus joined together through a cold sealing process.

In a subsequent step, the sun gears 2a, b are inserted. The lateral installation disk 7 has an installation hole 17 for this, which is large enough that the sun gears 2a, b can be inserted through it. As a result, the installation hole 17 forms the key region for subsequent integration of the components, in particular the planet gears 3a, b and the sun gears 2a, b in the housing interior 12.

Figure 3:
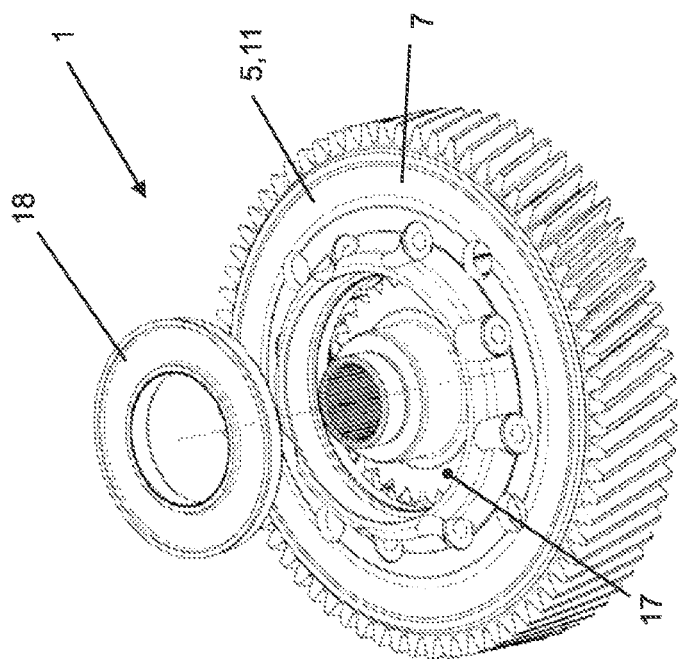
FIG. 3 shows the planetary differential device from FIG. 1 in the same illustration in FIG. 2, with the end cap placed thereon.

As is shown in FIG. 3, the installation hole 17 is subsequently closed by an end cap 18, which is placed thereon axially. The end cap 18 is circular, wherein an insertion shaft can be inserted through the end cap 18 and then connected to the second sun gear 2b.

As can be derived when viewed in combination with FIG. 1, the end cap 18 is pressed into the lateral installation disk 7, in particular into the installation hole 17. The end cap 18 is thus retained in the installation hole 17 in a form and/or force fitting manner. The end cap 18 has numerous functions. The planetary differential device 1 has two sliding bearing bushings 19a, b, wherein a first sliding bearing bushing 19a is placed on an inner circumference of the first lateral disk 6a. This region is missing on the lateral installation disk 7, because this is where the installation hole 17 is located. For this reason, the end cap 18 is placed thereon subsequently, and the sliding bearing bushing 19b is placed on the end cap 18. The sliding bearing bushings 19a, b support the sun gears 2a, b axially as well as radially. In particular, the end cap 18 forms an axial support for the second sun gear 2b.

In a more precise examination of the seam geometry of the welding seams 8a, b, it can be seen that there is a receiving shoulder 20a, b for each of the lateral disks 2a, b in the coupling gear 9, such that they are centered in the coupling gear 9 before welding.

As a result, the planetary differential device 1 has the advantage that no welding is necessary after completion of the receiving housing 11. The processing of the bearing seats 15a, b, through holes 16a, b, in particular bore holes, and the toothing 10 in the assembly can take place after completing the receiving housing 11, such that the relative positioning of these functional surfaces in relation to one another is not compromised by an imprecise joining of these components to one another. The installation is the last production step for the planetary differential device 1, such that no contamination of the sun gears 2a, b and/or planet gears 3a, b can occur as a result of welding spatter, smoke residue, soot, etc.

LIST OF REFERENCE SYMBOLS 1 planetary differential device
2a, b sun gears
3a, b planet gears
4a, b planet gear pins
5 planet carrier
6a, b lateral disks
7 lateral installation disk
8a, b welding seam
9 coupling gear
10 toothing
11 receiving housing
12 housing interior
13a, b lip
14a, b bearing mechanisms
15a, b bearing seats
16a, b through holes
17 installation hole
18 end cap
19a, b sliding bearing bushings
E input
A outputs
H main axis

The invention claimed is:

1. A planetary differential device comprising:
a first and a second sun gear wherein the sun gears are coaxial to one another and define a main axis;
first and second planet gears wherein the first planet gears mesh with the first sun gear and the second planet gears mesh with the second sun gear, and wherein the first and second planet gears mesh with one another in pairs;
a planet carrier having two lateral disks, wherein the first and second planet gears are rotatably disposed in the planet carrier; and
a coupling gear coaxial to the main axis and permanently connected to the planet carrier;
wherein the lateral disks are each materially bonded to the coupling gear and form a receiving housing with a housing interior, wherein at least one of the lateral disks is a lateral installation disk having an installation hole having a diameter that exceeds an outer circumference of the first sun gear and an outer circumference of the second sun gear such that the planet gears and the sun gears are insertable into the housing interior through the installation hole.

2. The planetary differential device according to claim 1, wherein the lateral disks are welded to the coupling gear an outer circumference of the lateral disks.

3. The planetary differential device according to claim 1, wherein at least one of the lateral disks provides a bearing seat for a bearing for supporting the receiving housing on a surrounding structure.

4. The planetary differential device according to claim 1, further comprising an end cap placed on the lateral installation disk and axially securing the second sun gear via a press fit in relation to the main axis.

5. The planetary differential device according to claim 4, wherein the end cap supports a sliding bearing bushing for supporting the second sun gear.

6. The planetary differential device according to claim 1, further comprising first and second planet gear pins configured to support the first and second planet gears and wherein the first and second planet gear pins are secured in the receiving housing in a form fitting or force fitting manner.

7. The planetary differential device according to claim 6, wherein at least one of the lateral disks has at least one through hole for receiving one of the planet gear pins.

8. A method for producing the planetary differential device according to claim 6, comprising the steps:
joining the coupling gear and the lateral disks to the receiving housing; and
installing the first and second planet gears and the sun gears in the housing interior of the receiving housing.

9. The method according to claim 8, wherein at least one bearing seat for a bearing mechanism or at least one through hole for receiving one of the planet gear pins are formed in the receiving housing.

10. The method according to claim 9, wherein after joining the receiving housing only non-thermal procedures are used for any further finishing work on the planetary differential device.

11. A differential for a vehicle, the differential comprising:
a first sun gear having a first outer diameter;
a second sun gear coaxial to the first sun gear along a common axis and having a second outer diameter;
a first set of planet gears in meshing engagement with the first sun gear;
a second set of planet gears in meshing engagement with the second sun gear, and wherein at least some of the first set of planet gears and the second set of planet gears are in meshing engagement with one another;
a planet carrier having lateral disks, wherein the first and second sets of planet gears are rotatably disposed in the planet carrier; and
a coupling gear permanently connected to the planet carrier;
wherein the lateral disks form a receiving housing having a housing interior, wherein at least one of the lateral disks has an installation hole having a diameter that exceeds the first and second diameters such that the planet gears and the sun gears are insertable into the housing interior.

12. The differential of claim 11, wherein the lateral disks are materially bonded to the coupling gear.

13. The differential of claim 12, wherein the lateral disks are welded to the coupling gear at a circumference of the lateral disks.

14. The differential of claim 11, further comprising an end cap on one of the lateral installation disks and axially securing the second sun gear in a material bonded manner in relation to the axis.

15. The differential of claim 14, wherein the end cap supports a sliding bearing bushing configured to support the second sun gear.

16. The differential of claim 11, further comprising a first planet gear pin and a second planet gear pin, wherein the first and second planet gear pins support the first and second sets of planet gears and are secured in the receiving housing in a form fitting manner.

17. The differential of claim 11, wherein the coupling gear is coaxial to the axis.

* * * * *